Patented July 6, 1926.

1,591,439

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

VULCANIZATION OF CAOUTCHOUC AND PRODUCT OBTAINED THEREBY.

No Drawing.      Application filed November 5, 1923. Serial No. 672,825.

My invention relates to the vulcanization of caoutchouc or rubber compounds, and it is particularly directed to increasing the rate of vulcanization to improve the resulting product and decrease its cost.

The desirability of an accelerator depends upon its power to increase the rate of vulcanization and to improve the physical characteristics of the resulting product. The effect of an accelerator may be better controlled and utilized when its chemical characteristics are known. Occasionally an entire class of compounds will be set forth as good accelerators, and, of course, it frequently occurs that certain of the compounds of such class are much more powerful than others. It sometimes happens that a compound of a class will be found to be a good accelerator, which is the only one of the class that is of any practical value in such capacity. Consequently, in order to determine the largest number of members of a certain class of elements that are effective as accelerators, it is desirable to know the chemical reactions that occur to determine what group of elements are responsible for the curing power.

One object of the present invention is to disclose a group of elements which may serve as the nucleus for a number of powerful and desirable accelerators.

Certain thiazoles have been mentioned as being accelerators of merit, and one of the first descriptions of such accelerators may be found in a co-pending application, Serial #520689, filed Dec. 7, 1921 Patent No. 1,544,687. Investigation of the thiazoles led to the discovery that a certain ring formation of elements was necessary to the structure of this class of compounds in order to produce accelerators of desirable characteristics. If the group

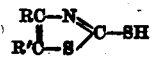

is present, an accelerator of desirable characteristics is assured. In the formula indicated, R may be an alkyl or aryl group and R' may be an H atom, an alkyl or aryl group. It should be noted that the C atoms, bonded to each other, may be a part of the benzene ring, as in the mercaptobenzothiazoles. However, there are a number of compounds that may be formed, as above mentioned, where R and R' are independent radicals, and it is this class of accelerators that it is desired to claim in this application.

The saturated ring structure

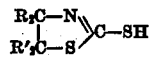

also assures good accelerators, although such compounds are only approximately one-fourth as powerful as those embodying the unsaturated group.

The difference in activity between accelerators embodying the unsaturated group and those including the saturated group, is indicated by comparison of the following compounds:

(A) $CH_3-C-N$
        $\phantom{CH_3-}||\phantom{-}\ \ \ \ C-SH$    2-mercapto-4-methylthiazole
        $\phantom{CH_3-}H-C-S$ (B) $(CH_3)_2C-N$
        $\phantom{(CH_3)_2}\ \ \ \ \ \ \ C-SH$    2-mercapto-4-methylthiazoline
        $\phantom{(CH_3)_2}H_2C-S$ (C) $H_2C-N$
        $\phantom{H_2}\ \ \ \ C-SH$    2-mercaptothiazoline
        $H_2C-S$ The accelerators were embodied in compounds comprising 100 parts rubber, 3.5 parts sulphur, 5 parts zinc oxide and 1 part accelerator. Compound containing A was well cured in five minutes at a temperature corresponding to 40 pounds of steam pressure, the product having a tensile strength of 200 kgs. per sq. cm. and an elongation of 730%. The compound including B resulted in a well-cured product in twenty minutes at a temperature corresponding to 40 pounds of steam pressure and having a tensile strength of 160 kgs. per sq. cm. with an elongation of 790%. The compound embodying C gave a well-cured product in forty minutes at a temperature corresponding to 40 pounds of steam pressure and having a tensile strength of 124 kgs. per sq. cm., with an elongation of 850%.

It will be seen from the foregoing results that accelerators containing the unsaturated group are somewhat more powerful than those having the saturated group as a nucleus. Moreover, the substitution of an alkyl radical apparently gives greater power than when an H atom is added to the group.

An example of a compound obtained when R of the group

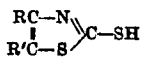

is an aryl radical, may be found in 2-mercapto-4-phenyl-thiazole

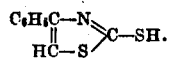

When one part of this compound was mixed with 100 parts of rubber, 5 parts of zinc oxide and 6 parts of sulphur, a well-cured product was obtained, after subjecting it to a temperature corresponding to 40 pounds of steam pressure for eight minutes.

The metallic salts, such as zinc, lead, cadmium and mercury of 2-mercapto-4-phenyl-thiazole are also accelerators of high power which impart desirable characteristics to rubber compounded therewith. As in the case of benzothiazoles disclosed in the application referred to above, these thiazoles are also oxidized with sulfur to form the corresponding thiazyl-disulfides and polysulfides. They, too, are accelerators and may be utilized in a manner not unlike the true mercapton. Many other derivatives are possible, which would of course include metallic salts to which reference has already been made.

A great many experiments were performed in order to determine whether the group herein disclosed was necessary to insure the formation of a powerful accelerator. It is not believed that it is necessary or desirable to set forth these experiments in detail in order to impart an understanding of the invention. It may be stated, however, that the group

may exist in straight chain compounds with no noticeable accelerating effect in rubber mixes containing them. Furthermore, it has been noted that many compounds of ring formation, embodying the last-mentioned group, although possessing an accelerating ability, are not so effective as those compounds including the group

In certain of the claims, the group has been defined as having an alkyl or aryl radical bonded to the fourth carbon atom; such wording should not be strictly interpreted. This follows because the alkyl or aryl radical might be bonded to the carbon in position four or five with substantially equivalent results. Inasmuch as the nomenclature depends upon the numbering of the cyclic atoms, the group is set forth as it is numbered in order to give a definite understanding of the position of the various atoms,

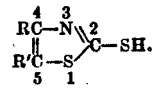

Although I have specifically set forth certain compounds formed about a plurality of groups as nuclei, it is obvious that other desirable and effective compounds may be produced within the scope of the invention, and I desire therefore that only such limitations shall be imposed as indicated in appended claims.

What I claim is:

1. A method of accelerating the vulcanization of caoutchouc which comprises vulcanizing the same in the presence of a material having the following structural formula

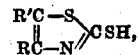

or any of its derivatives, where radical R or R' includes a plurality of carbon atoms.

2. A method of accelerating the vulcanization of caoutchouc which comprises vulcanizing the same in the presence of a material having the following structural formula

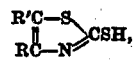

or any of its derivatives, where radicals R and R' taken additively include a plurality of carbon atoms.

3. A method of accelerating the vulcanization of caoutchouc which comprises vulcanizing the came in the presence of a material having the following structural formula

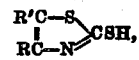

or any of its derivatives, where R or R' is an aryl radical.

4. A method of accelerating the vulcanization of caoutchouc which comprises vulcanizing the same in the presence of a material having the following structural formula

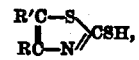

or any of its derivatives, where either R or R' or both are of cylic formation.

5. The method of accelerating the vulcanization of caoutchouc that comprises vulcanizing the same in the presence of a material having the structural formula

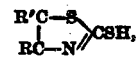

where R' is hydrogen or a cyclic radical embodying hydrogen.

6. A method of accelerating the vulcanization of caoutchouc which comprises vulcanizing the same in the presence of 2-mercapto-4-phenylthiazole or any of its derivatives.

7. A method of accelerating the vulcanization of caoutchouc which comprises vulcanizing the same in the presence of a metallic salt of 2-mercapto-4-phenylthiazole or any of its derivatives.

8. A caoutchouc product which has been vulcanized in the presence of a material having the structural formula

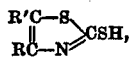

or a derivative thereof, where the radical R or R' includes a plurality of carbon atoms.

9. A caoutchouc product which has been vulcanized in the presence of a material having the structural formula

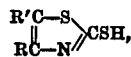

or a derivative thereof, where the radicals R and R' taken additively include a plurality of carbon atoms.

10. A caoutchouc product which has been vulcanized in the presence of a material having the structural formula

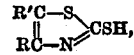

or any of its derivatives, where R or R' is an aryl radical.

11. A caoutchouc product which has been vulcanized in the presence of a material having the structural formula

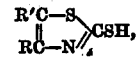

or any of its derivatives, where R or R' or both are of cyclic formation.

12. A caoutchouc product which has been vlucanized in the presence of 2-mercapto-4-phenylthiazole or any of its derivatives.

13. A caoutchouc product which has been vulcanized in the presence of a metallic salt of 2-mercapto-4-phenylthiazole.

In witness whereof, I have hereunto signed my name.

LORIN B. SEBRELL.